(12) United States Patent
Bentmar et al.

(10) Patent No.: US 6,569,539 B2
(45) Date of Patent: May 27, 2003

(54) GAS BARRIER PACKAGING LAMINATE METHOD FOR PRODUCTION THEREOF AND PACKAGING CONTAINERS

(75) Inventors: Matts Bentmar, Svedala (SE); Mikael Berlin, Lund (SE); Ib Leth, Kavlinge (SE)

(73) Assignee: Tetra Level Holdings & Finance S.A., Pully (CH)

( * ) Notice: Subject to any disclaimer, the term of this patent is extended or adjusted under 35 U.S.C. 154(b) by 0 days.

(21) Appl. No.: 09/265,413

(22) Filed: Mar. 10, 1999

(65) Prior Publication Data

US 2002/0061413 A1 May 23, 2002

Related U.S. Application Data

(63) Continuation-in-part of application No. 09/065,065, filed as application No. PCT/SE96/01403 on Oct. 30, 1996, now abandoned.

(51) Int. Cl.⁷ .............................................. B32B 23/04
(52) U.S. Cl. ...................... 428/532; 428/480; 428/481; 428/507; 428/511
(58) Field of Search ................. 428/480, 481, 428/507, 511, 532

(56) References Cited

U.S. PATENT DOCUMENTS

| 2,489,170 A | 11/1949 | Wooster |
| 2,808,381 A | 10/1957 | Stone |
| 3,137,588 A | 6/1964 | Taylor |
| 3,505,354 A | 4/1970 | Doebel et al. |
| 3,661,697 A | 5/1972 | Kimmel et al. |
| 3,876,452 A | 4/1975 | Anspon et al. |
| 4,460,425 A | 7/1984 | Rausér et al. |
| 4,873,147 A | 10/1989 | Jansen et al. |
| 4,894,386 A | 1/1990 | Brown et al. |
| 5,096,767 A | 3/1992 | Harada et al. |
| 5,230,944 A | 7/1993 | Beer et al. |
| 5,290,798 A | 3/1994 | Gillard et al. |
| 5,420,289 A | 5/1995 | Musser et al. |
| 5,587,204 A | 12/1996 | Kinsey, Jr. et al. |
| 5,654,039 A | 8/1997 | Wenzel et al. |
| 5,679,421 A | 10/1997 | Brinton, Jr. |
| 5,837,383 A | 11/1998 | Wenzel et al. |

FOREIGN PATENT DOCUMENTS

| CH | 484111 | 1/1970 |
| DE | 1816335 | 7/1970 |
| EP | 0 085 919 A1 | 8/1983 |
| EP | 0 313 356 A2 | 4/1989 |
| EP | 0337767 | 10/1989 |
| EP | 0 385 054 A1 | 9/1990 |
| EP | 0 530 662 A1 | 3/1993 |
| EP | 0 601 562 A1 | 6/1994 |
| EP | 0 615 838 A1 | 9/1994 |

(List continued on next page.)

OTHER PUBLICATIONS

Doebel et al., *J. Med. Chem.*, 15 (10), 1972, 1081–1082.
Schevitz et al., *Nature Structure Biology*, 39 (26), 1996, 5119–5136.
Dillard et al., *J. Med. Chem.*, 39 (26), 1996, 5119–5136.
Dillard et al., *J. Med. Chem.*, 39 (26), 1996, 5137–5158.
Draheim et al., *J. Med. Chem.*, 39 (26), 1996, 5159–5175.
Roy et al., *J. Physiol. Pharmac.*, 26 (3), 1982, 207–214.

Primary Examiner—Samuel A. Acquah
(74) Attorney, Agent, or Firm—Burns, Doane, Swecker & Mathis, L.L.P.

(57) ABSTRACT

The invention relates to a packaging laminate having one or more gas barrier layers of starch or starch derivative providing an oxygen gas barrier property of 50, preferably 30 cm3/m2 at 24 h, 1 atm (23° C., 50% RH) or better, said gas barrier layer having a dry coating weight no more than 7 g/m2. The invention also relates to a method for producing such a packaging laminate and to packaging containers manufactured from the packaging laminate.

11 Claims, 3 Drawing Sheets

FOREIGN PATENT DOCUMENTS

| | | |
|---|---|---|
| EP | 0620215 | 10/1994 |
| EP | 0 649 870 A1 | 4/1995 |
| FR | 1492929 | 12/1967 |
| FR | 2 684 922 | 6/1993 |
| WO | WO 91/16375 | 10/1991 |
| WO | WO 93/11300 | 6/1993 |
| WO | WO 93/16877 | 9/1993 |
| WO | 9323391 | 11/1993 |
| WO | 9513266 | 5/1995 |
| WO | WO 96/01707 | 1/1996 |
| WO | WO 97/13639 | 4/1997 |
| WO | WO 97/16312 | 5/1997 |
| WO | WO 97/22536 | 6/1997 |
| WO | 9805637 | 2/1998 |
| WO | 9808818 | 3/1998 |

GAS BARRIER PACKAGING LAMINATE METHOD FOR PRODUCTION THEREOF AND PACKAGING CONTAINERS

This application is a continuation-in-part of Ser. No. 09/065,065, filed Oct. 9, 1998 now abandoned, which is a 35 U.S.C. 371 application of PCT/SE96/01403, filed Oct. 30, 1996, which claims the benefit of priority under 35 U.S.C. 119 of Swedish application 9503817-0, filed Oct. 30, 1995, the contents all of which are hereby incorporated by reference. This application also claims the benefit of priority under 35 U.S.C. 119 of Swedish applications 9800769-3, filed Mar. 10, 1998, and 9801675-1, filed May 13, 1998, the contents both of which are hereby incorporated by reference.

BACKGROUND OF THE INVENTION

1. Field of the Invention

The present invention relates to laminated packaging materials including a gas barrier layer, which comprises starch or a starch derivative, and to methods of making such laminates. The invention also relates to packaging containers and packages manufactured from the laminated packaging materials of the invention.

2. Description of the Related Art

In the packaging industry, use is often made of packages of the single-use type for packaging and transporting of various products, such as, for example, liquid food products. In order to benefit from respective advantageous properties of various materials, such different materials are often laminated together into a packaging laminate. Depending on circumstances, the aim is often to provide the best possible protection to the product to be packed, at the same time as the package must be sufficiently mechanically strong to allow for convenient handling.

For packaging of liquid food products during prolonged transport and storage, it may be important that the packaging laminate provides barrier properties towards gases, such as oxygen as well as towards liquids and moisture. Usually, the package is also required to be dimensionally stable in order to provide easy handling at transport and distribution as well as in use.

Liquid barrier properties are usually provided in a laminated packaging material by means of outer layers of plastics. Such outer layers of plastics are usually also sealable to each other by means of melt fusion, in order to provide liquid tight seals of the package in a cost efficient and reliable manner. Normally thermoplastics, such as polyolefins are employed for this purpose, and polyethylenes, such as preferably low density polyethylenes (LDPE), are most often used.

Mechanical strength and configuration stability may be obtained by the incorporation of a more rigid, core layer in the packaging laminate, usually a dimensionally stable but foldable paper or paperboard. This is usually an intermediate layer but the term "core layer" used herein includes such layers even when they form one external face of the laminate.

Barrier properties towards oxygen gas are obtained by incorporation of a layer of one of a number of barrier materials known in the art. Examples of such known oxygen barrier materials are metals and metal oxides such as aluminium foil (Al foil), silicon oxide and siloxane coatings (SiOx) on to a polymer substrate layer as well as polymer materials having gas barrier properties, such as polyamides (PA), polyvinyl alcohol (PVOH), ethylene vinyl alcohol polymers (EVOH) and polyehtyleneterephtalate (PET). In addition to such synthetic materials, the possibility of using natural and biodegradable polymers (biopolymers) such as starch and starch derivatives, as gas barrier materials has been investigated.

It is previously known that starch possesses some gas barrier properties when employed in relatively thick layers, such as in films having a thickness of about 20 to 30 $\mu$m. Such thick layers of starch material are not suitable for use in packaging laminates however, since they become brittle and are prone to cracking and breaking upon handling, for example in the lamination process and when fold forming of the laminate into packages. Besides not being flexible in handling at manufacturing and distribution, laminates including such thick layers of starch would also be capable of absorbing more moisture, which would influence the gas barrier properties negatively.

From WO97/16312 it is known that very thin layers of starch applied on to a core layer may provide gas barrier properties, at least when employed together with an adjacent layer of plastics, which has been united with the starch barrier layer by extrusion coating of the plastics material. Two very thin layers of starch, applied in a quantity of 0.5 and 1 g/m2 respectively, dry weight, on to opposite sides of a core layer of paperboard and each extrusion coated with a layer of plastics, provided an oxygen gas barrier of 289 cm3/m2, per 24 h at 1 atm. Similarly, two layers of starch, applied in a quantity of 1 and 1.5 g/m2 respectively, provided an oxygen gas barrier of 141 cm3/m2, per 24 h at 1 atm. The results obtained were thus, comparable with the gas barrier properties of, for example, a 12 $\mu$m thick film of oriented PET, thus representing a "medium performance barrier" material.

The packaging laminate WO97/16312 is, however, merely a medium performance gas barrier material. This means that it may only be used for packaging of liquid food products during short time periods of cool storage. It is not hitherto known in the prior art to produce packaging laminates having high performance gas barrier properties from starch or starch derivative barrier materials. It would be much more desirable to be able to provide a packaging material having sufficient gas barrier properties for long time storage of liquid food products, i.e. for extended shelf life (ESL) at cool storage or even for aseptic storage. Such desirable high performance oxygen gas barrier properties are in the order of about 50 cm3/m2 at 24 h, 1 atm (23° C., 50% RH) or better, e.g. up to 30 cm2/m2 at 24h 1 atm, i.e. oxygen gas barrier properties comparable to those of, for example, PVOH, EVOH (ethylene vinylalcohol copolymer) or polyamides (PA) when employed at a thickness of the order of about 5 $\mu$m.

We have now established that it is possible in a packaging laminate to obtain high performance oxygen barrier properties from the use of starch and similar materials.

SUMMARY OF THE INVENTION

Accordingly the present invention now provides a packaging laminate, preferably having a core of paper or paperboard, having one or more gas barrier layers of starch or a starch derivative providing an oxygen gas barrier property of 50 cm3/m2 at 24 h, 1 atm (23° C., 50% RH) or better, said gas barrier layer or layers having a dry coating weight or aggregate coating weight no more than 7 gm−2. Preferably the gas barrier layer is deposited on a plastics layer carried by said core layer, and/or having a plastics layer laminated at high temperature thereon. Preferably, oxygen barrier property provided by the starch or starch derivative layer is 40 cm3/m2 at 24 h, 1 atm (23° C., 50% RH) or better. More preferably the oxygen barrier property is up to 30 cm3/m2 at 24 h, 1 atm (23° C., 50% RH), e.g. 10 cm3/m2 at 24 h, 1 atm (23° C., 50% RH) or below.

Preferably, the packaging laminate comprises a layer of plastics polymer, preferably a thermoplastics, e.g. polyethylene, laminated directly with the said gas barrier layer. Most preferably, said polymer is LDPE. Other thermoplastics that may be employed include all other kinds of polyethylene (including LLDPE, ULDPE, VLDPE, M-PE and HDPE), polyproplylene, and polyethyleneterephthalate.

The gas barrier layer is applied at a dry coating weight of up to 7 gm−2, e.g. from 0.5 to 5 gm−2, more preferably 0.5 to 3 gm−2, e. g. from 1.5 to 2 gm−2.

We prefer that the gas barrier layer be made entirely from natural materials but it is acceptable to include minor amounts of other polymeric materials which do not interfere with the desired properties. For instance the gas barrier layer may further comprise a minor amount of water soluble or water dispersible polymers having functional hydroxyl groups, e.g. polyvinyl alcohol, and carboxyl group containing polyolefins such as ethylene acrylic acid, or a mixture thereof. The amount of such materials may be from 0 to 30%, e.g. 0 to 20% or 0 to 10% by weight.

We have observed that when polyethylene is applied to a layer of starch at a high temperature, e.g. over 200° C., the gas barrier properties of the starch are improved and that under appropriate conditions can be made to reach or move further into a high performance level. One preferred method of obtaining optimal properties is to apply the starch or starch derivative not to a thick core layer as in WO97/16312 but to a separate carrier. Suitably then, the gas barrier layer is carried by a carrier layer of paper or plastics.

When paper is employed it is preferably thin, e.g. said carrier layer may be of paper having a surface weight of from 10 to 25 g/m2. The paper may also be coated beforehand with a layer of plastics.

After application of the starch, the carrier may be combined with a thicker core material so that the packaging laminate comprises a core layer having said carrier layer on one surface side thereof. Said core layer may be of paper, paperboard, foamed polymer or thick polymer and there may be one or more layers including a heat sealing layer on the other surface side of said core layer.

The invention includes a method for producing a packaging laminate having gas barrier properties, which process comprises applying a solution or dispersion of starch or a starch derivative in a liquid vehicle to a surface of a substrate, said substrate preferably comprising a paper or paperboard core layer, and removing said liquid vehicle to deposit said starch or starch derivative on said surface, and optionally applying a layer of plastics to said starch or starch derivative so as to modify the properties of said starch or starch derivative such that the starch or starch derivative provides a gas barrier property, wherein the surface of the substrate is substantially impervious to said liquid vehicle and the starch or starch derivative provides a gas barrier property of 50 cm3/m2 at 24 h, 1 atm (23° C., 50% RH) or better.

The degree to which the surface is impervious to liquid may be measured by measuring surface adsorption, e.g. in Cobb units. ('Cobb'=g(water)/m2 adsorbed on to the surface in 60 seconds exposure to liquid water). Adsorption of other liquids could be measured in an analogous method. The method of measuring Cobb adsorption is defined in SCAN P12-64 and in TAPPI T441. The surface adsorption of plastics is generally about 1 Cobb, while a smooth paper surface will generally have an adsorption of about 20 to 30 Cobb. Suitably, for use in the invention the substrate surface should have an adsorption of 50 Cobb or less, preferably an adsorption of 30 Cobb or less, more preferably an adsorption of less than 20 Cobb or most preferably an adsorption of 10 Cobb or less, e.g. less than 5 Cobb.

In an alternative aspect, the invention provides a method for producing a packaging laminate having gas barrier properties, which process comprises applying a solution or dispersion of starch or a starch derivative in a liquid vehicle to a surface of a substrate, said substrate preferably comprising a paper or paperboard core layer, and removing said liquid vehicle to deposit said starch or starch derivative on said surface, and optionally applying a layer of plastics to said starch or starch derivative so as to modify the properties of said starch or starch derivative characterized in that the surface of the substrate has a smoothness of 200 Bendtsen or better and in that the starch or starch derivative provides a gas barrier property of 50 cm3/m2 at 24 h, 1 atm (23° C., 50% RH) or better. The method of measuring Bendtsen smoothness is defined in SCAN (Scandinavian Pulp and Paper Norms) P21-67 and in TAPPI UM535.

Where the substrate is plastics or has a plastics surface, such desired smoothness is usually obtained, such as in, for example, a film of plastics, a plastics coated laminate substrate, or a plastics coated paperboard laminate substrate.

One reason why a high barrier property was not achieved in WO97/16312 may be that the paperboard core layer lacked the requisite degree of impermeability so that the aqueous solution of starch which was employed may have penetrated the surface. This might have an adverse action in a number of ways. There may not then be a smooth and unbroken surface to the starch layer because of penetration as such into the paperboard. Alternatively, or additionally, drying of the paperboard to dry the starch layer may cause surface deformation of the paperboard and hence cracking of the starch layer.

The substrate is therefore desirably sufficiently impervious to the liquid vehicle or sufficiently liquid repellent that there is a homogeneous starch layer of even thickness formed upon drying the starch layer.

The paperboard used in WO97/16312 would typically be expected to have had a surface smoothness of 500–600 Bendtsen. This may in itself have been sufficient to prevent the starch layer being smooth and unbroken or from having thin areas providing a path for oxygen transmission.

In order to avoid cracks, punctures or deformations in the starch or starch derivative layer, it is preferred that the surface on to which it is applied is smooth, e.g. that the substrate surface has a smoothness of 200 Bendtsen or better (i.e. less ), e.g. from up to 150 Bendtsen, most preferably about 100 Bendtsen.

The packaging laminate may consist solely of the gas barrier layer and the plastics polymer layer, the substrate being used only in the making of the laminate without being a permanent part of it. Thus, a solution or dispersion of starch or a starch derivative may be applied to a hard substrate plate (such as glass, ceramic or metal) or another form of temporary carrier and dried to form the required layer of starch (or its derivative). Polyethylene or other thermoplastics may be extrusion coated onto the starch (or derivative) layer and the resulting two layer laminate may be stripped off the carrier to provide a plastics film having improved gas barrier properties. Optionally, a second plastics layer may be applied to the opposite side of the starch layer to encapsulate the starch.

More preferably however, the substrate to which the starch or derivative is applied becomes a permanent part of the packaging laminate. Where the finished laminate comprises a core layer of sufficient thickness to provide rigidity to containers made therefrom, e.g. paperboard, it is preferred that the starch or derivative is not applied directly to the core material but rather that it is applied to a carrier material as said substrate and that this is later (before or during the application of said plastics layer) laminated to the core layer, e.g. by extrusion lamination.

Starch for use in the invention may be of any conventional type although certain starches provide better results than others under the conditions we have used. Modified potato starch is preferred, such as Raisamyl 306 (Raisio) which is hypochlorite oxidised. Other acceptable starches include corn starch and derivatives, such as Cerestar 05773, a hydroxypropylated corn starch.

Starch derivatives that are suitable for use in the invention include oxidized starch, cationic starch and hydroxpropylated starch.

It will be understood that when the gas barrier property of the packaging laminates of the invention is referred to as being provided by a particular material, e.g. starch or a starch derivative, this does not exclude the case where the gas barrier property is the result of an interaction between the stated material and an adjacent layer in the laminate, rather than a bulk property of the stated material viewed in isolation.

It may be that a contributing mechanism in the improvement in barrier property noted when polyethylene is applied at a high temperature to a layer of starch comes from penetration of polyethylene molecules into the starch, replacing water in starch crystals. Other polymers producing a similar effect may be used.

Said plastics layer may be applied to said starch or starch derivative by melt extrusion or may be applied as a preformed film by hot pressure lamination e.g. with a heated roller. Generally, any technique may be employed in accordance with this preferred embodiment that provides the required modification of the barrier property of the starch.

Preferably said plastics layer is bonded to the starch or starch derivative at a temperature of at least 200° C., preferably from 250 to 350° C. most preferably from 250 to 330° C.

The invention includes a packaging container or package formed using a packaging laminate as described or by a method as described according to the invention.

The present invention will now be described and illustrated in greater detail herein below with the aid of non-restrictive examples of methods, as well as packaging laminates obtainable by the method, according to preferred embodiments of the present invention and with reference to the accompanying drawings.

Figure 1A:
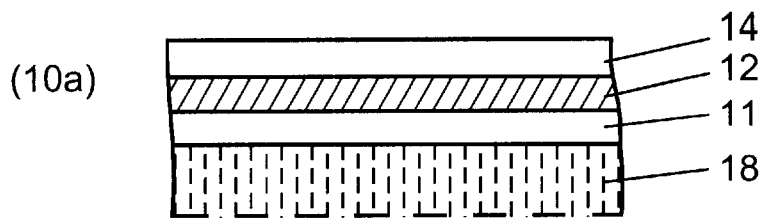
FIGS. 1(a,b,c,d) schematically illustrate cross-sections of four different packaging laminates according to specific embodiments of the invention.

It should be noted that the various packaging laminates according to the invention may comprise a multiple number of layers in addition to those shown in the drawings. It will thus be obvious to a person skilled in the art that the number of layers may vary and that the following description should not, therefore, be considered as restrictive of the present invention.

DESCRIPTION OF THE PREFERRED EMBODIMENTS

Figure 2A:
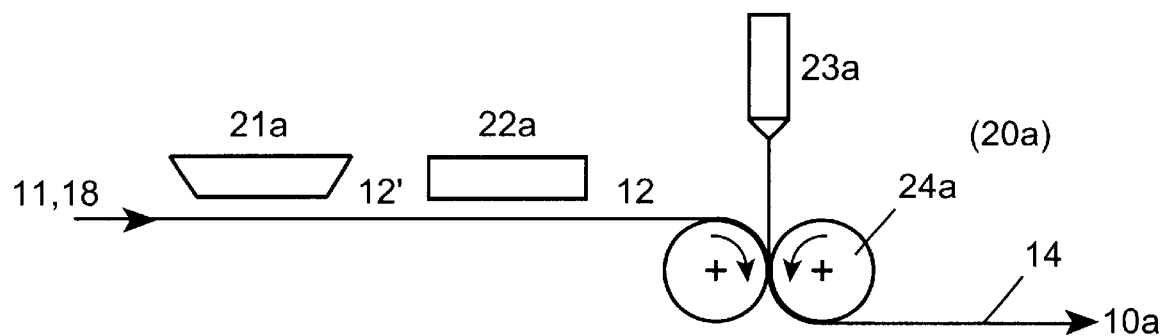
FIGS. 2(a,b,c,d) schematically illustrates the methods of manufacturing of the respective packaging laminates as described in FIG. 1.

FIG. 1a thus schematically illustrates a cross-section of a packaging laminate according to a simple embodiment of the invention, carrying the generic reference numeral 10a, while FIG. 2a schematically illustrates the method (denoted 20a) of manufacturing of the laminate 10a. The packaging laminate 10a comprises a substrate layer 11, whose surface has a smooth, essentially non-absorbing texture. The substrate 11 may be a plastics film, or a thin paper having said surface qualities. A thin paper substrate having a surface weight of about 10–25 g/m2 is not able to absorb much from the starch solution both since it is very thin and since such commercially available thin papers usually have very smooth and glossy, hard surfaces. A particularly suitable paper for this purpose is so-called glassine paper, which, however, is rather expensive compared to other commercially available papers. Suitably, the paper may be MG Kraft paper (Munksjö) of 10 to 25 g/m2 surface weight, MG indicating that the paper is smooth on one surface, which is where the starch should be applied preferably. Most preferably, the substrate 11 is a plastics film since it has the most advantageous surface properties.

The substrate may alternatively consist of one or more extra layers beneath the substrate layer. The substrate may, for example, alternatively comprise a core layer 18 (dotted line) being coated with a surface layer of plastics 11 having the desired surface qualities.

A thin layer of an aqueous solution or dispersion of starch is applied on to the upper side of a web of substrate layer 11, which is led in the direction of the arrow from a magazine reel (not shown) to a coating station 21a. The starch solution is preferably applied by means of liquid film coating technology, also called "dispersion coating" or "wet coating", which is well known in the prior art of coating of aqueous solutions and dispersions, but also other coating methods are feasible according to the invention, e.g. spray coating. The aqueous starch solution is applied in such a quantity that the applied and dried starch layer 12 has a thickness/surface weight of from about 0.5 to about 3 g/m2.

The web coated with aqueous solution 12' is led further to a drying station 22a at which the web is dried with aid of a drying apparatus for removing water from the applied aqueous starch solution. Drying may be carried out by any conventional drying apparatus such as an infra-red (IR) drier or an air drier. Preferably, drying takes place at a temperature of about 80–100° C.

From the drying station the dried web, having an upper layer 12 of starch, is led further to an extruder station at 23a at which the web and starch layer is further laminated to a layer of plastics 14. The lamination of the starch surface to the plastics layer is carried out by means of surface fusion between plastics layer and the starch layer 12, which is obtained by simultaneous application of heat and the plastics. Preferably, molten polymer is extruded on to the dried starch layer at the same time as the web is led through the nip between two rotary cooling rollers 24a, thus forming a finished packaging laminate 10a as shown by a cross-section view in FIG. 1a, having an outer layer of plastic 14, laminated to the starch layer. The extruded plastics material is (preferably) a thermoplastic polymer, preferably a polyethylene and most preferably LDPE, which enables efficient conversion of the packaging laminate 10a into liquid-tight, dimensionally stable packages by so-called heat sealing. The extrusion temperature should be at least 200° C., preferably from about 250° C. to about 330° C.

Alternatively, said surface fusion between the starch layer 12 and the plastic layer 14 may be obtained by laminating a pre-manufactured film of thermoplastic to the dried starch layer 12 by means of simultaneous application of heat and pressure, preferably by means of leading the starch-coated substrate and the plastic film together through a hot roller nip, whereby the temperature supplied by the hot rollers is at least 200° C. and up to about 350° C., preferably from about 250° C. to about 330° C.

Figure 1B:
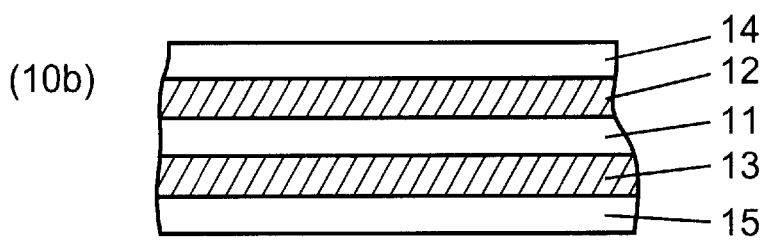
Figure 2B:
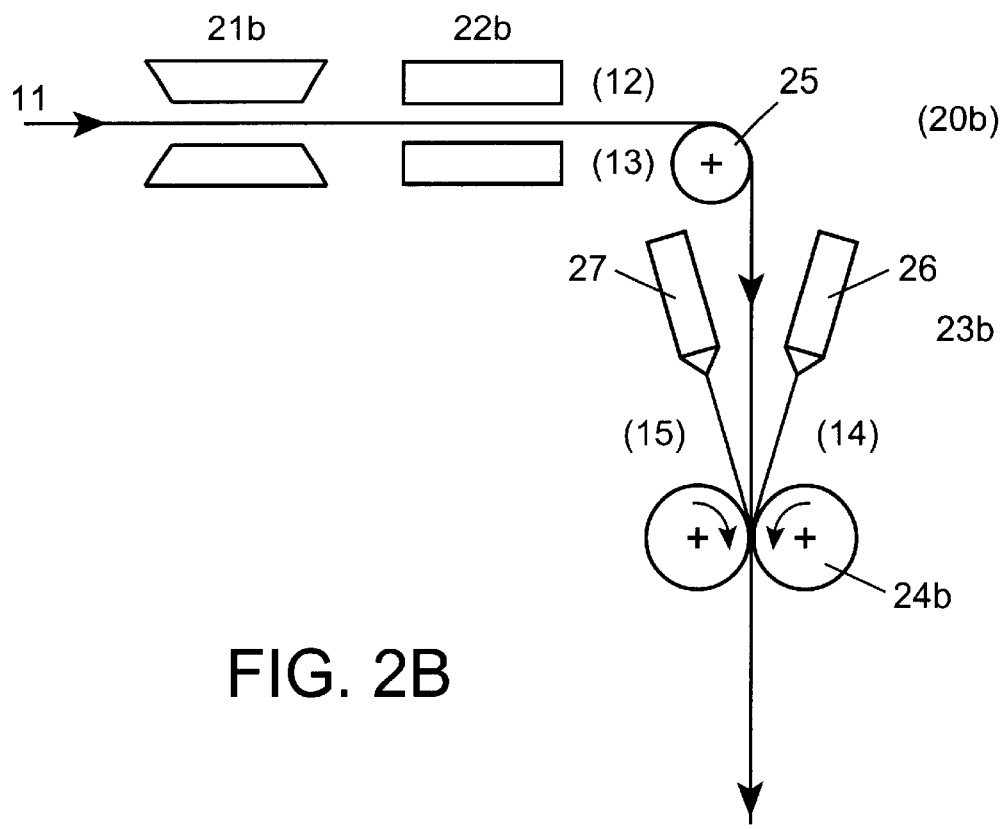

FIG. 1b schematically illustrates a cross-section of a packaging laminate 10b according to another embodiment of the invention and FIG. 2b schematically illustrates the method (denoted 20b) of manufacturing of the laminate 10b.

According to this embodiment of the invention, the substrate or carrier layer 11 is coated on both sides by an aqueous starch solution in the same way as described in the embodiment of FIGS. 1a and 2a.

Consequently, the packaging laminate 10b, which has been manufactured by the method of FIG. 2b, comprises a substrate layer 11 as defined above, preferably being a film of plastics, a thin layer of starch (12,13) applied on to each side of the substrate layer 11 and the outer layers of plastics (14,15) laminated to the outer sides of respective starch layer, by means of surface fusion of the outer plastics layers and the starch obtained by simultaneous application of heat as described above. With such a layer structure, a double gas barrier effect should be obtained, since two fusion bonded interfaces between starch and plastics are obtained.

Accordingly, with the method of FIG. 2b, a thin layer of an aqueous solution of starch is applied on to each side of a web of a substrate layer 11, which is led in the direction of the arrow from a magazine reel (not shown) to a coating station 21b. The starch solution is preferably applied by means of dispersion coating technology in such a quantity on to each side of the substrate layer 11, that the applied and dried starch layers 12, 13 each have a thickness/surface weight of from about 0.5 to about 3 g/m2.

The web coated with aqueous solution 12', 13' is led further to a drying station 22b at which the web is dried with the aid of a drying apparatus for removing water from the applied layers of aqueous starch solution. Preferably, drying takes place at a temperature of about 80–100° C., as described above.

From the drying station the dried web, having an upper layer 12 and a lower layer 13 of starch, is led further via a bending roller 25 to an extruder station at 23b at which the web is further coated with a layer of plastics on each side. Thus the layers of plastics 14 and 15 are applied by means of an extruder 26, 27 operating on each side of the web. The molten polymer is extruded on to the dried starch layers at the same time as the web is led through the nip between two rotary cooling rollers 24b, in principle as described above, thus forming a finished packaging laminate 10b as shown by a cross-section view in FIG. 1b.

Figure 1C:
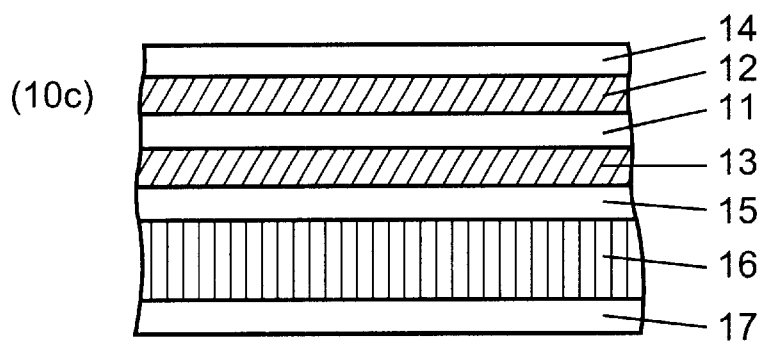
Figure 2C:
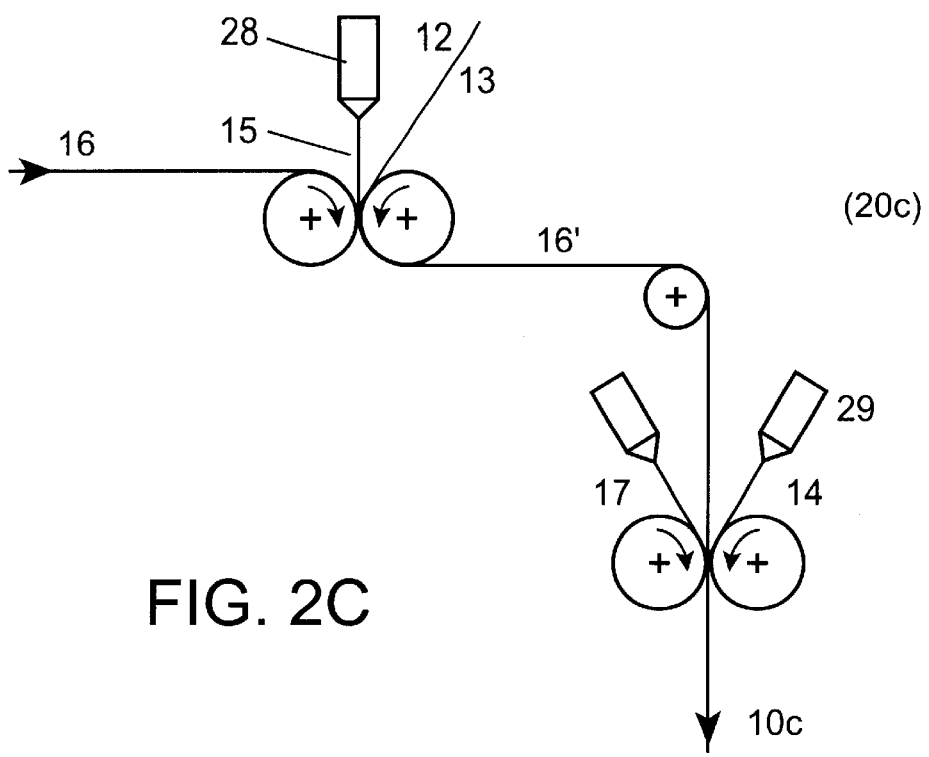

FIG. 1c schematically illustrates a cross-section of a packaging laminate 10c according to an alternative embodiment of the invention while FIG. 2c schematically illustrates the method (denoted 20c) of manufacturing of the laminate 10c. The packaging laminate 10c corresponds to the laminate 10b of FIG. 1b, but further comprises a core layer in order to provide the laminate with mechanical strength and dimensional stability in addition to the layers as described in the laminates 10a and 10b respectively. Such a core layer may consist of paper, paperboard, a relatively thick layer of polymer or a layer of foamed polymer.

A paper or paperboard core layer usually has a thickness of from about 100 µm up to about 400 µm, and a surface weight of approximately 100–500 g/m2, preferably about 200–300 g/m2.

The packaging laminate 10c is manufactured by applying and subsequently drying a thin layer of an aqueous starch solution 12, 13 on to both sides of a substrate layer 11, as described in the method 20b above in an initial step. According to the method 20c, a first web of the core layer 16, is led in the direction of the arrow from a magazine reel (not shown) to an extrusion lamination station 28 at which a second web of the substrate layer 11 having a dried layer of starch applied on to each side 12, 13 is superposed and laminated to the core layer by means of an intermediate melt extruded lamination layer 15 of a thermoplastics polymer, preferably a polyethylene and most preferably LDPE.

The web of laminated core, starch and substrate layers 16' is further led to an extruder station 29 at which an outer layer of thermoplastics 14,17, such as preferably LDPE, is further extruded on to each side of the laminate 16', such that the starch layer 12 on the outer side of the substrate layer 11, which is opposite to the side which is laminated to the core layer, as well as the opposite side of the core layer 16, are both coated by the extruded thermoplastics, thus forming layers 14 and 17.

Suitable thermoplastics for the outer layer 14 are polyolefins, preferably polyethylenes and most preferably low density polyethylenes such as, for example LDPE, linear LDPE (LLDPE) or single site catalyst metallocene polyethylenes (m-PE). The outer layer 17, which eventually will form the outside of the packaging container manufactured from the packaging laminate, may alternatively be applied on to the core web 16 in a step before the coating and drying steps of the starch solution.

Figure 1D:
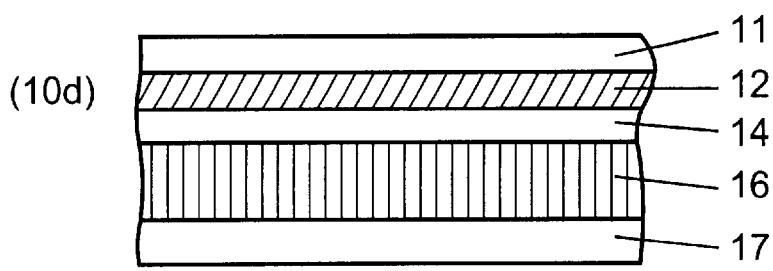
Figure 2D:
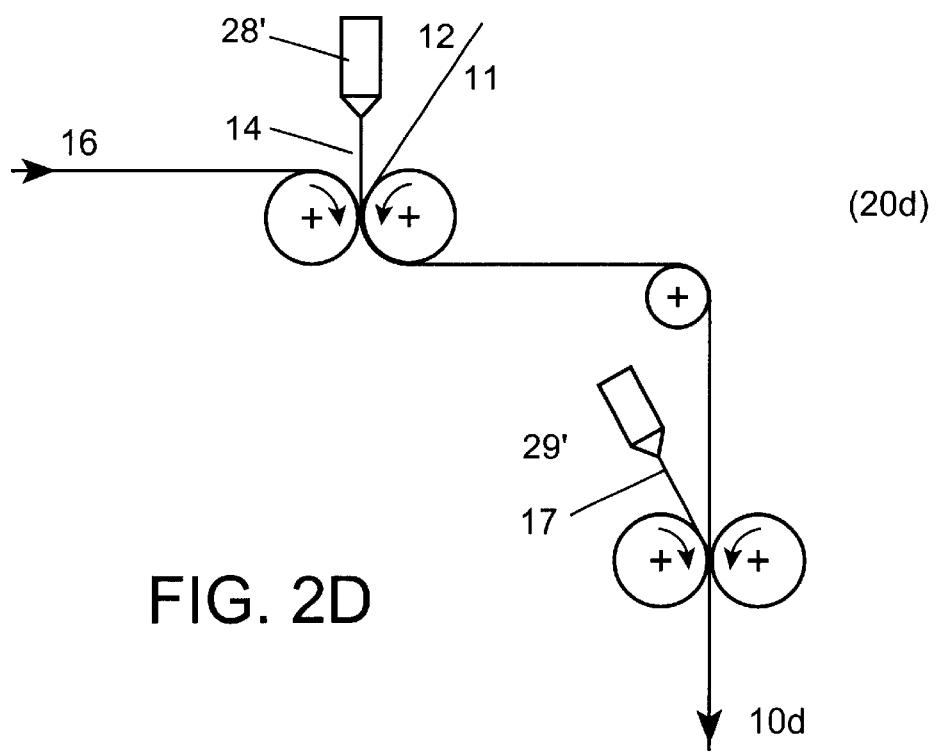

FIG. 1d schematically illustrates a cross-section of a packaging laminate 10d according to another embodiment of the invention while FIG. 2d schematically illustrates the method (denoted 20d) of manufacturing of the laminate 10d. The packaging laminate 10d is manufactured by applying and drying of a thin layer of an aqueous starch solution 12 on to the upper side of a substrate layer 11, which is constituted of a plastic film, as described in the method 20a above, in an initial step.

According to the method 20d, a first web of the core layer 16, is led in the direction of the arrow from a magazine reel (not shown) to an extrusion lamination station 28' at which a second web of the substrate layer 11 having a dried layer of starch applied on to one side 12, is super-posed such that the starch layer 12 is directed towards the core layer and laminated to the core layer by means of an intermediate melt extruded lamination layer of a thermos-plastic polymer, preferably a polyethylene and most preferably LDPE. The substrate layer 11, i.e. the plastics film, may form an outer layer of the packaging laminate to be directed inwards in a packaging container manufactured therefrom, thus providing a container inside layer. In a final extruder station 29', the outer thermoplastic layer 17 is applied by means of extrusion coating.

A problem of the laminates described in WO97/16312 is that their manufacture would require completely different machinery to that of the paperboard laminates using aluminium foil as a gas barrier which are in conventional use. Such packaging laminates are made by extrusion laminating a paper board substrate to the barrier foil using polyethylene. In contrast, as can be seen from the above, a carrier layer of plastics or thin paper bearing a starch coating on one or both faces, with or without plastics already applied to the starch layer or to one or both of them, can simply be substituted for the aluminium foil in conventional machinery with minor adjustment. The preparation of the starch bearing carrier material can be done completely separately in another facility if need be so that an existing converting line in a factory can readily be adapted to use the new materials.

Thus a further important advantage by a preferred embodiment of the method illustrated, is that the steps of application and drying of the starch solution may be performed off the lamination processing line, thus avoiding costly modifications and re-construction of the lamination equipment in the manufacturing of packaging laminates having a core layer. By applying the starch layer on to a thin carrier layer such as a plastics film or a thin paper having a smooth, essentially non-absorbing surface, in the subsequence lamination with further layers of plastics and a core layer, the lamination operation may be performed using the same equipment and process as is used today, when laminating for example Al foil and inside layers.

From sheet or web-shaped, preferably pre-creased and color decorated, blanks of the packaging laminate 10, liquid-tight, dimensionally stable packages of the single-use disposable type are produced in accordance with conventional "form-fill-seal" technology, according to which the packages are formed, filled and sealed by means of modern, rational packaging and filling machines. From, for example, a web of the packaging laminate, such packages are produced in that the web is first reformed into a tube, by both longitudinal edges of the tube being united with another by heat sealing in a longitudinal overlap joint seal. The tube is filled with the pertinent contents, for example liquid food, and is divided into individual packages by repeated transverse sealings of the tube, transversely across the longitudinal axis of the tube, beneath the level of the contents in the tube. The packages are finally separated from one another by transverse incisions along the transverse seals and are given the desired geometric, normally parallelepipedic form by an additional forming and heat-sealing operation in a per se known manner.

Using the methods and materials described above by applying the aqueous solution of starch or a derivative on to a substrate layer for supporting the starch layer, which consists of a specifically chosen material, in combination with subsequent drying and lamination to a layer of plastics by heat fusion of the plastics surface, highly improved oxygen gas barrier properties are obtained in packaging laminates compared to those of WO97/16312. The improvement in the gas barrier properties of the laminated starch layer has been improved radically by a factor of about 10, into a so-called high performance barrier layer. The best gas barrier results have been obtained when the substrate layer consists of a polymer or has a polymer coated surface, but also a thin paper layer having a surface weight of approximately 10–25 g/m2 with smooth, essentially non-absorbing surfaces, will provide improved gas barrier properties compared to those previously known in connection with starch.

When 2 grams of starch per m2 is coated on to a plastic film (polyester-PET) and subsequently extrusion coated by a layer of LDPE, an oxygen gas barrier of only 9 cm3/m2 at 24 h, 1 atm (23 C, 50% RH) is obtained. Similarly, a starch layer of 5 g/m2 results in an oxygen barrier of about 4 cm3/m2 and 7 g/m2 in only 3 cm3/m2.

The optimal gas barrier properties obtained in these examples when using a substrate layer of plastics or having a surface of plastics are, thus believed to be at least partly the result of the quality of the surface, i.e. smoothness and liquid repellence. While the mechanism of the effect obtained using a fusion bonded interface between starch and plastic layers is not fully understood, the optimal gas barrier properties may also partly be the result of there being such an interface formed on both sides of the starch layer, since the substrate layer to which the starch is applied is a plastics layer and the same kind of phenomenon may occur at this interface upon the application of heat to the starch and plastic layers.

The starch gas barrier layer according to the invention is advantageously applied in an amount of from about 0.5 to 3 g/m2, dry weight. At amounts lower than 0.5 g/m2, the tolerances of the layer thickness as well as the gas barrier properties will become less reliable. On the other hand, at amounts exceeding about 3 g/m2, the risks that the starch barrier layer may become brittle and inflexible will increase. However, amounts applied of up to about 5 g/m2, dry weight, are possible and for some type of packages and uses even higher amounts might be acceptable. The gas barrier property of the starch layer generally improves with increasing thickness. The optimal and preferred applied amount of starch ranges from about 1.5 to about 2 g/m2.

EXAMPLES

Packing laminates were prepared using various substrates described below and various starches with or without additives as also described below.

LDPE coated board substrates were prepared by extrusion coating 15 g/m2 LDPE at 325° C. on to "Duplex" paperboard (Billerud) having a surface weight of 280 g/m2 and a bending stiffness/flexural rigidity of 320 mN. The LDPE was LD273 (Dow), having a melt index of 6.5 to 7.5.

Extrusion of LDPE was carried out by means of a single screw extruder on to the paperboard just before passing between a cooling roller and a counter pressure roller. The cooling roller had a surface temperature of about 10–15° C.

Other substrates employed were 36 μm OPET film and Kraft paper.

Starch was prepared for use in coating from a dry powder state by mixing 10 wt % of starch with water at ambient temperature to form a slurry. The slurry was heated with mixing to from 90 to 95° C. and kept at that temperature for 30 minutes. During heating the starch swelled.

If possible, e.g. with Raisamyl 306 (Raisio), the starch was cooled to ambient before use in coating. However, where this would have caused the starch to gel, e.g. with CERESTAR, the starch was coated hot (60°).

A wet weight of approximately ten times the desired dry coating weight was applied to the substrate in web form using a liquid film coating/dispersion machine from Hirano of the knife-over-roll type, also known as a "comma-direct coater" or "bull-nose coater".

A first drying stage using IR heating to 80 to 100° C. was used to speed the drying process followed by a hot air drying step in which the starch coating was hot air dried at web speed of 1 m/min at a temperature of 110° C. Generally, a temperature of 100 to 130° C. is suitable depending on the linespeed.

In some cases the dried starch layer was extrusion coated with LDPE. About 25 g/m2 of LDPE was extruded on to the dried starch layer at about 200 m/minute, 325° C., cooling roller at 10–15° C., as above. The distance between the extrusion die to the web was normally 10–30 cm. The extruded LDPE hit the web just before entering between the cooling roller and the counter pressure roller.

The results obtained in terms of oxygen gas barrier of the starch (adjusted to remove the contribution of OPET where necessary) are shown in Table 1.

TABLE 1

| Substrate | Starch | Starch coating weight/Thickness | PE coated on starch | O2 barrier cm3/m2, 24 h 1 atm, 23° C. 50% RH |
|---|---|---|---|---|
| 36 μm OPET (9) | Raisamyl (1) | 2 μm | No | 13.8 |
| 36 μm OPET (9) | Raisamyl (1) | 5 μm | No | 6.2 |
| 36 μm OPET (9) | Raisamyl (1) | 7 μm | No | 4.6 |
| 36 μm OPET (9) | Raisamyl (1) | 2 μm | Yes | 9 |
| 36 μm OPET (9) | Raisamyl (1) | 5 μm | Yes | 4 |
| 36 μm OPET (9) | Raisamyl (1) | 7 μm | Yes | 3 |
| PE coated board | Raisamyl (1) | 5 g/m² | No | 32 |
| PE coated board | Raisamyl (1) | 5 g/m² | Yes | 8 |
| PE coated board | Cerestar (2) | 5 g/m² | Yes | 37 |
| PE coated board | Cerestar (2) | 2 g/m² | Yes | 30 |
| Kraft paper (8) | Raisamyl (3) | 2 g/m² | Yes | 34 |
| Kraft paper (8) | Raisamyl (3) | 2 + 2 (4) | Yes | 18 |
| Kraft paper (8) | Raisamyl (5) | 2 | Yes | 23 |
| Kraft paper (8) | Raisamyl (5) | 2 + 2 (4) | Yes | 4 |
| Bill Duplex (6) | Raisamyl (7) | 2 + 2 (4) | Yes | 9 |

(1) Raisamyl 306 oxided starch - Raisio.
(2) Cerestar hydroxypropylated starch.
(3) Raisamyl 302 oxidised starch.
(4) Coated both sides with starch.
(5) Raisamyl 302 oxidised starch + 20% mowiol 20–98 (a PVOH additive).
(6) Billerud Duplex - no PE coating.
(7) Raisamyl 306 oxidised starch + 20% mowiol 20–98.
(8) 60 g/m2 Kraft paper - very smooth surface "ROYAL FLEXIBLE" (Assi Doman).
(9) Melinex 800 (ICI).

We claim:

1. A packaging laminate having a core of paper or paperboard and one or more gas barrier layers of starch or a starch derivative providing an oxygen gas barrier property of 50 cm$^3$/m$^2$ at 24 h, 1 atm (23° C., 50% RH) or better, said gas barrier layer or layers having a dry coating weight or aggregate coating weight no more than 7 g/m$^2$ and being deposited on said core layer or on a plastics layer carried on said core layer, wherein said core layer has a smoothness of 200 Bendtsen or more.

2. A packaging laminate as claimed in claim 1, wherein the oxygen barrier property provided by the starch or starch derivative layer is 30 cm3/m2 at 24 h, 1 atm (23° C., 50% RH) or better.

3. A packaging laminate as claimed in claim 1, comprising a layer of plastics laminated directly with the said gas barrier layer.

4. A packaging laminate as claimed in claim 3, wherein said plastics is polyethylene, polypropylene or polyethylene terephthalate.

5. A packaging laminate as claimed in claim 1, wherein the gas barrier layer is applied at a dry coating weight of up to 5 gm−2.

6. A packaging laminate as claimed in claim 5, wherein the gas barrier layer is applied at a dry coating weight of from 0.5 to 4 gm−2.

7. A packaging laminate as claimed in claim 5, wherein the gas barrier layer is applied at a dry coating weight of from 0.5 to 3 gm−2.

8. A packaging laminate as claimed in claim 5, wherein the gas barrier layer is applied at a dry coating weight of from 1.5 to 2 gm−2.

9. A packaging laminate as claimed in claim 1, wherein the gas barrier layer further comprises a minor amount of polyvinyl alcohol, ethylene acrylic acid, or a mixture thereof.

10. A packaging laminate as claimed in claim 9, having one or more layers including a heat sealing layer on the other surface side of said core layer.

11. A packaging container or package formed using a packaging laminate as claimed in claim 1.

* * * * *

UNITED STATES PATENT AND TRADEMARK OFFICE
CERTIFICATE OF CORRECTION

PATENT NO.    : 6,569,539 B2                                              Page 1 of 1
DATED         : May 27, 2003
INVENTOR(S)   : Mats Bentmar et al.

It is certified that error appears in the above-identified patent and that said Letters Patent is hereby corrected as shown below:

<u>Title page,</u>
Item [75], Inventors, -- Mats Bentmar, Svedala (SE); Mikael Berlin, Lund (SE); Ib Leth, Kavlinge (SE) --
Item [73], Assignee, -- Tetra Laval Holdings & Finance S.A., Pully (CH) --

Signed and Sealed this

Twenty-third Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,569,539 B2
DATED : May 27, 2003
INVENTOR(S) : Bentmar

It is certified that error appears in the above-identified patent and that said Letters Patent is hereby corrected as shown below:

<u>Title page,</u>
Item [63], Related U.S. Applications Data, please include the
Foreign Priority Data as follows:
-- Sweden 9800769-3 filed March 10, 1998 and Sweden 9801675-1 filed May 13, 1998 --

Signed and Sealed this

Twenty-fourth Day of February, 2004

JON W. DUDAS
*Acting Director of the United States Patent and Trademark Office*